United States Patent
Booton et al.

(10) Patent No.: US 9,538,012 B2
(45) Date of Patent: Jan. 3, 2017

(54) COMPUTER TELEPHONY

(75) Inventors: Laurence Jon Booton, London (GB); Benjamin James Paddock, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 495 days.

(21) Appl. No.: 13/638,882

(22) PCT Filed: Feb. 16, 2011

(86) PCT No.: PCT/GB2011/000217
§ 371 (c)(1),
(2), (4) Date: Oct. 1, 2012

(87) PCT Pub. No.: WO2011/121268
PCT Pub. Date: Oct. 6, 2011

(65) Prior Publication Data
US 2013/0028252 A1 Jan. 31, 2013

(30) Foreign Application Priority Data

Apr. 1, 2010 (GB) .................................. 1005553.1

(51) Int. Cl.
*H04L 12/66* (2006.01)
*H04M 7/00* (2006.01)
(Continued)

(52) U.S. Cl.
CPC ........... *H04M 7/0012* (2013.01); *H04M 3/382* (2013.01); *H04M 3/42263* (2013.01); *H04M 3/42323* (2013.01); *H04M 2203/6081* (2013.01)

(58) Field of Classification Search
CPC H04M 7/0012; H04M 3/42323; H04M 3/382; H04M 3/42263; H04M 2242/16; H04M 2203/6081
See application file for complete search history.

(56) References Cited

U.S. PATENT DOCUMENTS

2009/0067597 A1* 3/2009 Booton ..................... 379/110.01
2010/0246444 A1* 9/2010 Witzel ..................... H04W 8/06
370/255

FOREIGN PATENT DOCUMENTS

EP 1 838 076 9/2007

OTHER PUBLICATIONS

International Search Report for PCT/GB2011/000217 mailed Jun. 27, 2011.

* cited by examiner

Primary Examiner — Khaled Kassim
Assistant Examiner — Zhaohui Yang
(74) Attorney, Agent, or Firm — Nixon & Vanderhye PC

(57) ABSTRACT

Computer-telephony events are initiated by a user operating a computer terminal to control, through a computer-telephony controller, operation of a communications terminal. The computer-telephony controller receives from a first computer terminal a request for a first computer-telephony event; in which the request for the first computer-telephony event comprises a label value. The computer-telephony controller refers to a mapping between the label value and an identifier of a communications terminal; and initiates the requested first computer-telephony event controlling operation of the communications terminal. The computer-telephony controller then receives, from second computer terminal 2B, a request for the label value. The computer-telephony controller authenticates the label value request and provides to second computer terminal the requested label value. The computer-telephony controller then receives from second computer terminal a request for a (Continued)

second computer-telephony event, in which the request for the second computer-telephony event comprises the label value. The computer-telephony controller refers to the mapping; and initiates the requested second computer telephony event controlling operation of the communications terminal.

14 Claims, 2 Drawing Sheets

(51) Int. Cl.
*H04M 3/38* (2006.01)
*H04M 3/42* (2006.01)

COMPUTER TELEPHONY

This application is the U.S. national phase of International Application No. PCT/GB2011/000217 filed 16 Feb. 2011 which designated the U.S. and claims priority to GB 1005553.1 filed 1 Apr. 2010, the entire contents of each of which are hereby incorporated by reference.

This invention relates to computer-telephony integration (CTI) and to a system and method providing for control of communications terminals in a computer telephony system.

BACKGROUND AND SUMMARY

Computer telephony allows a user to control, from their networked computer terminal, telephony activity related to a telephony terminal nominated by the user: typically the telephone on their desk. The kind of telephony activity controlled in this way typically includes the initiation of calls from the telephone and the logging of calls to and from the telephone (i.e. allowing the user to redial outgoing calls or to respond to missed calls).

European patent 1068717 in the name of British Telecommunications plc discloses a method of registering the identity of a communications terminal in association with the identity of a computer terminal, the method comprising the steps of: providing to a user of the computer terminal, via the computer terminal, the identity of a predetermined destination terminal number; answering a call made to the predetermined destination terminal number; receiving at the predetermined destination terminal number the identity of a communications terminal from which the call was made; providing to the user, via the computer terminal, a codeword; receiving, at the predetermined destination terminal, data provided by the user via the telephone terminal; comparing the received data with the provided codeword; and if there is a match, registering the identity of the communications terminal in association with the identity of the computer terminal.

If a user wishes to use the computer-telephony control service from a different computer, e.g. at a hot desk remote from their normal place of work, they need to complete a new CTI registration process from the new computer. This will result in their original registration, based on their normal computer, being revoked. This arrangement is cumbersome and time-consuming in that it requires the user to repeat the complete original registration process any time they wish to use the computer-telephony control service from a different computer and to repeat it again when they return to their normal work computer.

The invention provides a method of initiating, in a call control system, computer-telephony events; in which the call control system comprises a computer-telephony controller and a plurality of communications terminals; in which a computer-telephony event comprises a user operating a computer terminal to control, through the computer-telephony controller, operation of at least one of one of the plurality of communications terminals, in which the method comprises: providing a label value for storing at a first computer terminal; and storing, in a mapping accessible by the computer-telephony controller, the label value together with the identifier of one of the plurality of communications terminals; the computer-telephony controller receiving from the first computer terminal a request for a computer-telephony event; in which the request comprises the label value; the computer-telephony controller retrieving the identifier of the communications terminal from the mapping; and initiating the requested computer-telephony event to control operation of the communications terminal; the computer-telephony controller receiving from a second computer terminal a request for the label value; and providing to the second computer terminal the requested label value; the computer-telephony controller receiving from the second computer terminal a request for a computer-telephony event; in which the request comprises the label value; the computer-telephony controller retrieving the identifier of the communications terminal from the mapping; and initiating the requested computer telephony event to control operation of the communications terminal.

According to an aspect of the invention, the label value is associated with one of an individual user, a group of users and a type of user, in which the one of the individual user, the group of user and the type of user associated with the label value is authorised to control the at least one of the plurality of phones.

According to an aspect of the invention, the method further comprises providing the computer terminal with a list of communication terminal identifiers to which the label value has previously been mapped; and allowing re-establishment of a previous mapping. According to a further aspect of the invention, the second mapping overwrites the first mapping.

According to an aspect of the invention, the method further comprises receiving from the computer terminal a mapping change request and creating, in response to the mapping change request, a second mapping accessible by the computer-telephony controller in which the label value is mapped to an identifier of a second communications terminal while leaving unchanged the label value stored at the computer terminal.

The invention further provides a call control system for initiating computer-telephony events; in which a computer-telephony event comprises a user operating a computer terminal to control, through a computer-telephony controller, operation of at least one of one of a plurality of communications terminals, in which the system comprises a computer-telephony controller and a plurality of communications terminals; in which the call control system comprises a store accessible by the computer-telephony controller, for storing a mapping between a label value and an identifier of one of a plurality of communications terminals; in which the computer-telephony controller comprises a first interface for receiving from a first computer terminal a request for a first computer-telephony event; in which the computer-telephony controller comprises a processor configured to receive through the first interface from the first computer terminal the request for a first computer-telephony event in which the request comprises the label value; to apply the label value to the mapping to retrieve from the store the identifier of the communications terminal; and to initiate the requested first computer-telephony event to control operation of the communications terminal; in which the computer-telephony controller comprises a second interlace for receiving from a second computer terminal a request for the label value and a request for a second computer-telephony event; in which the computer-telephony controller processor is configured to receive through the second interface from the second computer terminal the request for the label value; and to provide the label value to the second computer terminal; in which the computer-telephony controller processor is configured to receive through the second interface from the second computer terminal the request for a second computer-telephony event in which the request comprises the label value; to apply the label value to the mapping to retrieve the identifier of the communications terminal from the store; and to initiate the requested second computer telephony event to control operation of the communications terminal.

BRIEF DESCRIPTION OF THE DRAWINGS

Embodiments of the invention will now be described, by way of example, with reference to the accompanying drawings in which.

DETAILED DESCRIPTION OF PRESENT EXAMPLE EMBODIMENTS

Embodiments of the invention will now be described to illustrate how the invention provides an improved method of initiating computer-telephony actions by a user operating at different times different computer terminals to control through a call control system, operation of a communication terminal (e.g. phone). Computer-telephony events are initiated by a user operating a computer terminal to control, through a computer-telephony controller, operation of a communications terminal. The computer-telephony controller receives from a first computer terminal a request for a first computer-telephony event; in which the request for the first computer-telephony event comprises a label value. The computer-telephony controller refers to a mapping between the label value and an identifier of a communications terminal; and initiates the requested first computer-telephony event controlling operation of the communications terminal. The computer-telephony controller then receives, from second computer terminal 2B, a request for the label value. The computer-telephony controller authenticates the label value request and provides to second computer terminal the requested label value. The computer-telephony controller then receives from second computer terminal a request for a second computer-telephony event, in which the request for the second computer-telephony event comprises the label value. The computer-telephony controller refers to the mapping; and initiates the requested second computer telephony event controlling operation of the communications terminal.

Registration

Figure 1:
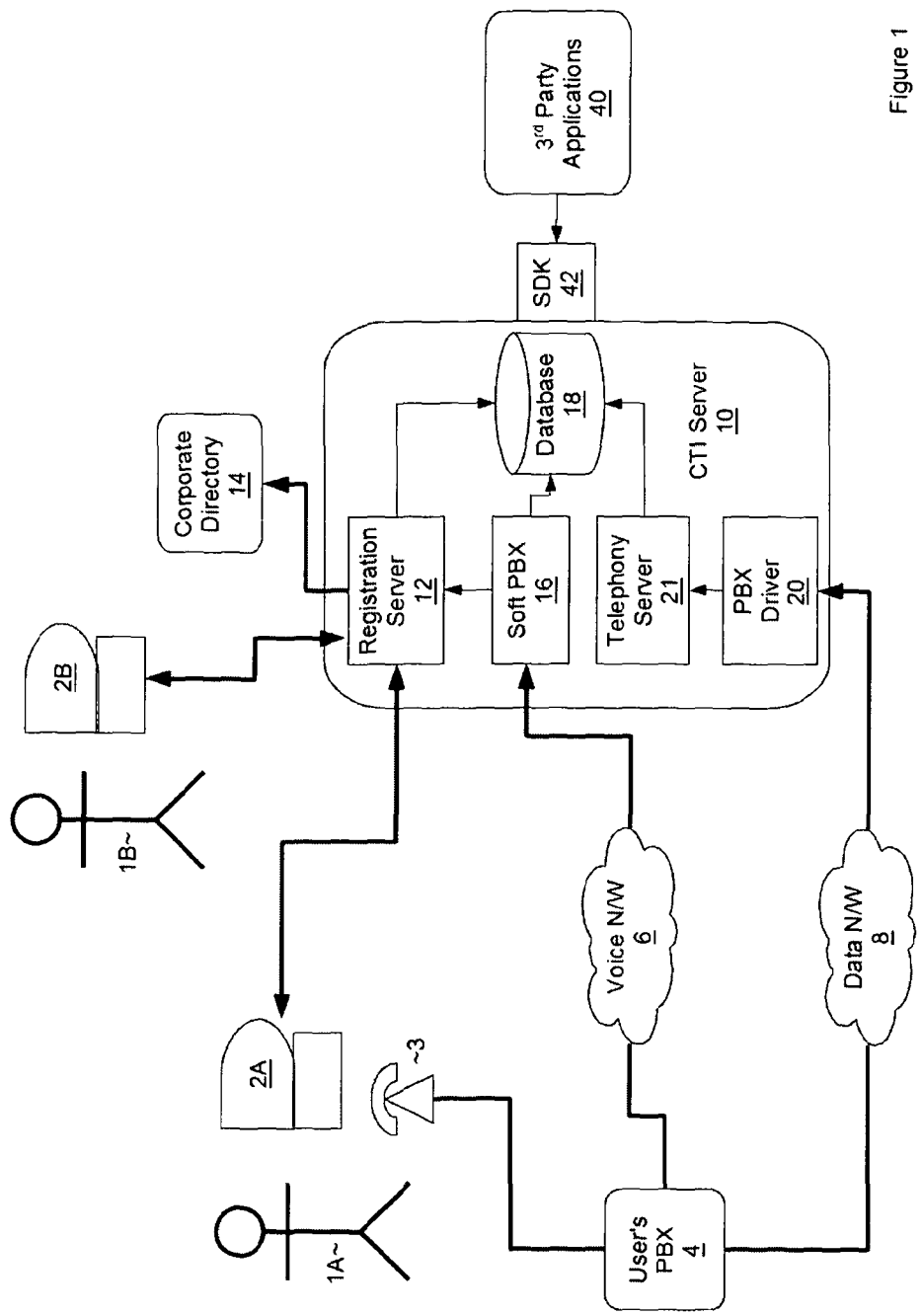
FIGS. 1 to 3 show schematically various aspects of a computer telephony system according to the invention.

A preferred embodiment of a call control system for changing the computer operated by a user to control a phone is shown in FIG. 1. FIG. 1 shows a user (represented as user 1A) operating a first computer terminal 2A to control a phone 3 via CTI server 10 which provides a computer-telephony control service. FIG. 1 also shows the same user (now represented as user 1B) operating a second computer terminal 2B to control the same phone 3 via the same CTI server 10. It will be appreciated that user 1A and user 1B represent the same user at different times. In order to take control of phone 3 from their computer terminal, user 1A has to first register with CTI server 10. Although described here with reference to control, from two different computer terminals, of the same phone, it may be that the phone being controlled will need to change at the same time as the computer terminal. This is because a change of computer terminal will normally be instigated on re-location of the user to a different desk or office so that the user will also want to change the phone they control to one at the desk or office the have moved to. Suitable ways of changing phones are described later.

User registration for the computer-telephony control service is comprised of two operations. The first operation involves the user navigating to a web page hosted on a web server (registration server 12) hosted on CTI server 10. On this web page they enter user credentials to prove their identity. If the credentials are successfully verified (e.g. by checking with a corporate directory 14, such as Microsoft Active Directory) the user's browser receives, from registration server 12 for display on the user's computer 2A, a contact number for an IVR system hosted by Soft PBX 16 on CTI server 10 and a numerical code or codeword (i.e. a string of characters), which is required for the second operation.

The second operation requires the user to call from the phone 3 they wish to control, via the connected PBX 4 and voice network 6, into the IVR service provided by soft PBX 16. The IVR service captures the identity of the phone 3, for example by monitoring the CLI (Calling Line Identifier) of the phone, and prompts (i.e. by voice prompt) user 1A to enter on phone 3 the codeword they received through the web page in the first operation. When the user has entered the codeword to the IVR service, the details provided are checked. If a codeword entered by the user is detected that matches what was presented on the web page, CTI server 10 knows that the user has access to the computer 2A and the phone 3 and the registration server creates a server label record (25 in FIG. 2). Otherwise, user registration is terminated. On successful registration, registration server 12 stores the label in server label record 25 and also copies a client label (described later) to user computer terminal 2A, typically to a web browser, although other forms of fat client could also be used.

CTI server 10 also comprises telephony server 21, which acts to capture, via PBX driver 20 and data network 8, CTI events from user's PBX 4. To clarify further, CTI server 10 has knowledge of several PBX systems (not shown) via data network 8 (e.g. an IP network). In order to provide to a user computer-telephony control of phone 3, CTI server 10 needs to know which PBX phone 3 is connected to. When a user activates the phone to contact the IVR system during the second operation of registration, a log of this particular event is sent from connected PBX 4 to PBX Driver 20 on CTI server 10, via data network 8. In this way, CTI server 10 knows from the event received from PBX 4, that the user's phone 3 is connected to PBX 4. For call control requests sent by the user following successful registration, CTI server 10 can exercise control via data network 8 of the correct PBX (i.e., in this case, PBX 4), in order to control the user's phone 3.

Database

Figure 2:
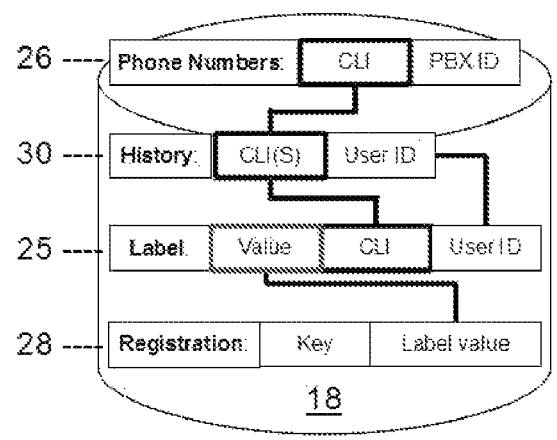

FIG. 2 shows a detailed view of database 18 relating to CTI server 10 of FIG. 1 and the various records that may be stored there. In particular, FIG. 2 shows a set of records relating to phone 3. Database 18 is accessible by CTI server 10 and is preferably co-located with it but may be hosted on a separate server (not shown), if more convenient. Phone number record 26 comprises the phone CLI and PBX identity relating to phone 3 and derived by the IVR service and telephony server 21 during registration of phone 3. Optionally; registration record 28 and history record 30 (described in more detail, below) are also provided.

As shown in FIG. 2, server label record 25, stored in database 18, contains the following information:

Unique value—(Value) a randomly generated number that is unique for each server label record (e.g. 123456789);

Phone CLI—(CLI) the caller ID that the phone presents when in call activity (e.g. 100100). Server label record 22 derives the CLI field from phone number record 26 described above;

Phone DN—(not shown) the Directory Number as known by the PBX it belongs to. This is derived from the data received from PBX 4 by telephony server 21;

PBX ID—the identity of the PBX the phone is connected to. This is similarly derived from the data received from PBX 4 by telephony server 21;

User ID—a unique identifier that identifies the user. It is captured at registration time during the credential entry stage (and verified by external source 14: e.g. corporate directory); the unique identifier may function to identify an individual user, a group of users or a type of user, authorised to control the phone.

Status—(not shown) a numeric code that indicates the status of the server label record e.g. 0 would mean OK and 7 would mean that the server label record has been cancelled, rendered inactive or is otherwise unusable.

The client label (not shown) stored persistently on user computer terminal 2A contains only domain information (e.g. a URL) to identify correct registration server 12 and the unique value (Value). This makes the data anonymous at the user end (i.e. it contains no indication of the identity of the phone being controlled) so countering fraudulent use.

Computer-Telephony Control

The web browser on computer terminal 2A now includes the client label when initiating computer-telephony control requests invoking the URL of Registration server 12. The client label is unique to the user and will stay with them throughout the duration of service. The client label forms part of each subsequent computer-telephony control request sent to CTI server 10 from the web browser running on user's computer terminal 2A. The client label is included with the requests in order to confirm the user's identity from which the identity of phone 3 (e.g. the CLI of the phone) the user is authorised to control via the CTI system is retrieved from server label record 25 in database 18. Note that server label record 25 is indexed for this operation by unique label value, (Value) and not user identity (which could more easily be faked).

Change of Computer

On changing computer terminal, the user sends to CTI server 10 from their new computer terminal 2B a request for the client label. On receipt of the request for the label, the request is preferably checked for correct form and authenticated and, if found valid, responded to by providing a copy of the label to new computer terminal 2B.

We now describe in more detail how the user can retain computer-telephony control of phone 3 when the user moves to use second computer terminal 2B. When a user moves to a different computer terminal, e.g. from first computer terminal 2A at the user's own desk to second computer terminal 2B at a hot desk or a colleague's desk, and the user wishes to continue to use the computer-telephony control service, the user navigates to registration server 12 hosted by CTI server 10. Registration server 12 serves a welcome page from which the user clicks on a link to request a check of their registration. The web browser on second computer terminal 2B responds to the user selecting the link by sending to CTI server 10 a request of the form:

"GET/registration/check.html HTTP/1.1
Host: www.cti-server.com
Label: name=
Accept: \*/\*"

Upon receiving this request, CTI server 10 (or more accurately, registration server 12 hosted on CTI server 10) will note that no client label is present in the request (i.e. the label name field is empty). In response to this request, registration server 12 will return a page to the user asking him or her to identify him or herself.

Authentication of the user will normally be desirable but is not essential in all implementations. Proof of user identity may be achieved in a number of ways, including based on recognising the network connection over which a request is received in a secure network. One way of proving user identity is for the user to enter a unique identifier (such as a user ID) and a password. Registration server 12 then checks these credentials against an authentication authority, typically an external repository such as corporate directory 14. If the credentials are accepted by registration server 12, e.g. registration server 12 finds the credentials supplied match the relevant records of the corporate directory, the user is authenticated. CTI server 10 then uses the unique identifier (User ID) provided by the user at the identification stage to locate the appropriate server label record 25 in database 18. Once the appropriate server label record 25 has been found, CTI server 10 creates a new client label using the unique value (Value) found in database label record 25 and passes the client label to the browser on second computer terminal 2B through registration server 12, as illustrated, below:

"HTTP/1.1 200 OK
Content-type: text/html
Set-Label: name=value
(content of page)"

Where the user has already registered with registration server 12 using second computer terminal 2B, the appropriate label value will be included in the request sent to registration server 12 and registration server 12 will serve a different page in response based on successfully finding the label value in database 18. The different page served by registration server 12 would confirm to the user who they are and what phone they are currently controlling.

Computer-Telephony Control on New Computer

The user can now issue requests comprising the client label for computer-telephony control of phone 3 from second computer terminal 2B. In fact, CTI server 10 is not necessarily aware of the source of the request (i.e. whether originating from first computer terminal 2A or second computer terminal 2B) but only looks to the label as a sign of authenticity. Continuing the above illustration, the next time a user initiates a computer-telephony request from second computer terminal 2B, the browser on second computer terminal 2B will include in the request a copy of the client label, as follows:

"GET/call/makecall.html?123 HTTP/1.1
Host: www.cti-server.com
Label: name=value
Accept: \*/\*"

On finding the client label in the request, CTI server 10 refers to the mapping, as before, and initiates the requested computer-telephony control of phone 3. In more detail, CTI server 10 extracts the client label from the request and uses the label Value field to create a database query. The database query searches for the server label record based on the label value. The query will only return one record—the record having the appropriate Value and CLI fields. When the label record is found, CTI server 10 extracts the CLI field identifying the phone the user is configured to control (i.e. phone 3) and initiates the computer-telephony request based on this information.

If the user now returns to first computer terminal 2A and initiates a computer-telephony control request, the request will produce a result similar to the result of sending a similar request from second computer terminal 2B, as the web browser on first computer terminal 2A will retain a copy of the label unless specific action has been taken to delete it. In response to the user operating first computer terminal 2A to initiate a computer-telephony control event, a computer-telephony control request including the label is sent by first computer terminal 2A to registration server 12. CTI server 10, responds as previously described to initiate the requested computer-telephony control.

Changing Phones

We now describe how the phone being controlled may be changed. A change of phone may occur at the same time as the change of computer terminal, e.g. where the change of computer terminal is instigated on re-location of the user so that the user may also want to change the phone they control to one at their new location. Registration of a new phone may simply be achieved by repeating the original registration procedure, for example according to the method set out in European patent 1068717, using the new phone they now wish to control, however, this can prove cumbersome and time-consuming.

An alternative and preferred embodiment has the user who wishes to change the phone over which they have control, issue to CTI server 10 an association change request to remove a first association between the first phone and the user and to establish a second association between a second phone and the user. On the basis of the association change request, the mapping in database 18 is edited to map the existing label to an identifier of the second phone. Following creation of the edited mapping, the user can now issue requests incorporating the same label for a computer-telephony action controlling the actions of the second phone.

According to this embodiment, a user registers only once to generate and receive a client label for use in supporting computer-telephony control requests to CTI server 10. The same client label is stored persistently and maintained every time the user switches control to a different phone. The user would typically register their primary-use phone initially but is free to amend the registration to switch control to another phone that the user has access to. Only one client label is required per user, irrespective of the number of changes of target phone which may be requested and implemented. Equally, only one server label record 25 is required per user, irrespective of the number of changes of target phone which may be requested and implemented. If the phone controlled via CTI server 10 changes, only the CLI information in server label record 25 in database 18 need be altered, the client label value held on user's computer terminal 2 does not change.

If a user wishes to control from their computer terminal a phone that they have not used before, the user will need to call the IVR service using the new phone to prove their identity (i.e. a similar operation as for original registration, described above: providing via the new phone a new codeword obtained by the user via their web browser from registration server 12 with which the user has authenticated). On receipt of call, the IVR service automatically detects the CLI of the phone being used and, upon successful identification of the user (i.e. receipt of the correct codeword), alters the CLI field in the user's records in database 18 (primarily, server label record 25) to that of the new phone. The client label does not change as a result of the change in phone.

Re-Registration.

According to a further embodiment, CTI server 10 stores, in history record 30 of database 18, details of phones previously registered with it for computer-telephony control by the user and displays the history to the user on request. Preferably history record 30 stores in database 18 a history, typically indexed by CLI, of phones previously associated, by means of server label record 25, with the user. History record 30 comprises a list of CLIs of previously registered phones and a user identity field. The user is then able to select from the CLI list in the history record 30, a phone whose CLI is recorded against the user's identity that the user wishes to re-take control of. The selected CLI is then included in the server label record 25, replacing the CLI of the currently registered phone. The client label held on user's computer terminal 2 and the value field (Value) of server label record 25 do not change.

It may be preferred not to extend the history feature to all phones. According to a further refinement, CTI server 10 is made aware if a phone is situated in a free-access area, such as on a hot desk. According to this refinement, CTI server 10 deletes the relevant association record from the history at the end of the day on which the phone was registered, thus forcing the user to prove they have control of the phone on any given day.

According to a further embodiment, history record 30 can be edited or deleted. If, for example, a user no longer wishes to be able to control from their computer terminal a phone (e.g. a hot desk phone) they have controlled from their computer terminal before and which has an entry in their history, the user (or an administrator) can remove from the user's history the entry relating to that phone or, if desired, remove from database 18 the whole of history record 30, referenced by the user's identity information.

According to an alternative embodiment, the IVR service could be provided by an application 40 such as a call routing server or a customer relationship management (CRM) application connected to CTI server 10 via a software development kit (SDK) 42. Application 40 could comprise BT Harrier Call Router as the Call Routing Server or one of the CRM applications provided by Oracle. The Call Routing Server is responsible for providing inbound call routing to a user's preferred end device (phone). An exemplary practical implementation of the invention might use BT iBridge as the CTI Server.

Figure 3:
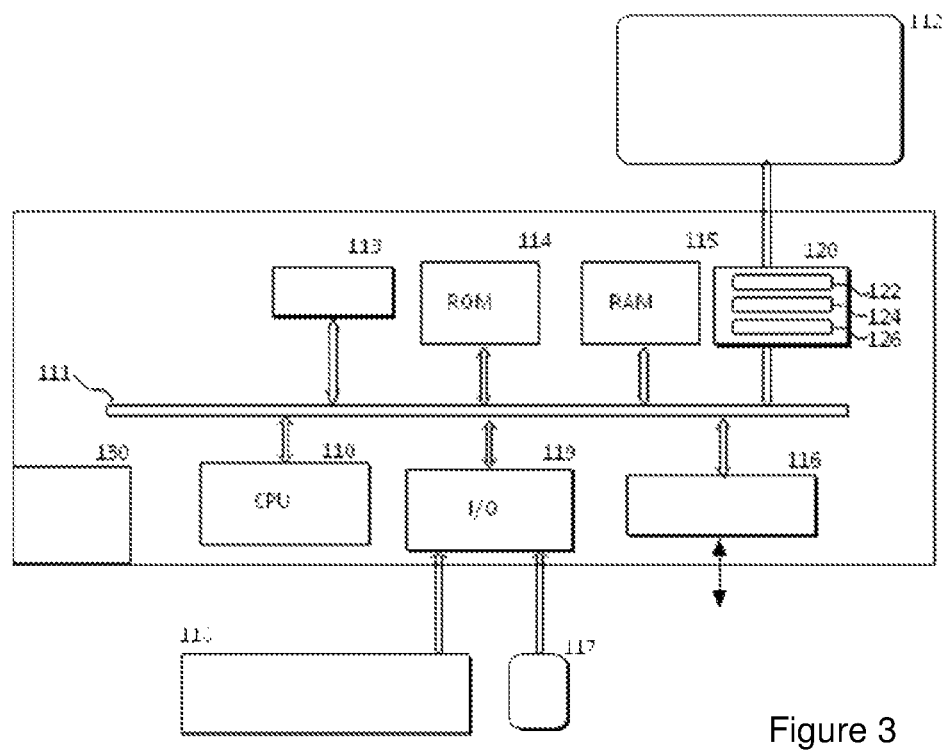

A typical architecture for a computer apparatus on which software implementing the invention can be run, is shown in FIG. 3. Each computer apparatus such as computer terminals 2A and 2B, CTI server 10 and servers hosting corporate directory 14 and third-party applications 40 comprises a central processing unit (CPU) 110 for executing computer apparatus programs and managing and controlling the operation of the computer apparatus. The CPU 110 is connected to a number of devices via a bus 111 to a variety of devices including non volatile data storage means. The non volatile data storage means may comprise one or more hard disc drives 120; in addition there may be provided removable non volatile data storage means, such as removable hard disc drives or optical media (for example re-writable or recordable DVDs) and solid state memory devices including non-volatile ROM 114 and volatile RAM 115.

The computer apparatus further includes one or more network card (one shown) for interfacing to and exchanging data via one or more network (not shown) such as an IP network underpinning the various connections shown in FIG. 1. The network interface(s), e.g. Ethernet, may be a local area network (LAN) adaptor connecting to a LAN. The LAN may itself be connected to other LANs and wide area networks (WANs) to enable the apparatus to communicate with and exchange data with other computer apparatuses. Alternatively, the network interface may be a DSL modem, or similar, that provides a connection to a WAN, such as the internet or an intranet, which enables communications with further networks.

The computer apparatus can also, optionally, include user input/output devices such as a mouse 117 and keyboard 118 connected to the bus 111 via input/output port 119, as well as a display 112. The computer apparatus is powered by power supply unit 130, typically obtaining power from an external power grid or internal battery (not shown). The skilled person will understand that this architecture is not limiting, but is merely an example of typical computer apparatus architecture. The computer apparatus may also be a distributed system, comprising a number of computer apparatuses communicating through their respective interface ports 116 such that a user may access program and other data stored on a remote computer apparatus using user input/output devices 112, 117, 118 on their local computer apparatus.

Non volatile data storage means 120 comprises an operating system 122 and one or more application programs 124. Operating system 122 comprises the software that the computing apparatus requires to operate, communicate with other computer apparatuses, receive input from users, display outputs and results to users, etc. Application programs 124 can be executed by the apparatus in order to provide additional functionality. Non volatile data storage means 120 further comprises computer apparatus code 126 which can be executed in order to perform a method according to the present invention, for example such as the one described above and illustrated in the drawings. It will be understood that computer apparatus code 126 may comprise a single integrated application, or a number of different modules that are accessed separately to execute a method according to the present invention. Each module may perform the functionality of one or more of the processes which comprise the present invention.

As will be understood by those skilled in the art, the invention may be implemented in computer program product software, any or all of which may be contained on various storage media so that the program can be loaded onto one or more computing devices (such as shown in FIG. 3) or could be downloaded over a computer network using a suitable transmission medium. The computer program product software used to implement the invention may be embodied on any suitable carrier, readable by a suitable computer input device (not shown), such computer program product comprising optically, magnetically or otherwise readable marks.

The above embodiments are to be understood as illustrative examples of the invention. It is to be understood that any feature described in relation to any one embodiment may be used alone, or in combination with other features described, and may also be used in combination with one or more features of another of the embodiments, or any combination of the embodiments. Further embodiments of the invention are envisaged and will be evident to the skilled reader. Furthermore, equivalents and modifications not described above may also be employed without departing from the scope of the invention, which is defined in the accompanying claims.

The invention may be implemented with any form of label comprising the Value field which is stored persistently on the user's computer terminal and allows the user to include it in computer-telephony control requests as a means of referring to a corresponding label mapped in a mapping accessible to the CTI sever to the identify of the phone to be controlled. Although described above in terms of a CTI server, the invention may be implemented with any form of call control system which interfaces with the user's computer terminal and phone to support user registration and call control, the issuing of a client label, mapping the client label to a phone identifier and call control instigated by a request received from the user's computer terminal. Server label record 25 and other records of database 18 may be stored at a different server to CTI server 10 or at another location to which CTI server 10 has access.

What is claimed is:

1. A method of initiating, in a call control system, computer-telephony events; in which the call control system comprises a computer-telephony controller and a plurality of communications terminals;
   in which a computer-telephony event comprises a user operating a computer terminal to control, through the computer-telephony controller, operation of at least one of the plurality of communications terminals,
   in which the method comprises:
   providing a label value for storing at a first computer terminal; and storing, in a mapping accessible by the computer-telephony controller, the label value together with the identifier of one of the plurality of communications terminals;
   the computer-telephony controller receiving from the first computer terminal a request for a computer-telephony event; in which the request comprises the label value;
   the computer-telephony controller retrieving the identifier of one of the communications terminals from the mapping; and initiating the requested computer-telephony event to control operation of a communications terminal;
   the computer-telephony controller receiving from a second computer terminal a request for the label value; and providing to the second computer terminal the requested label value;
   the computer-telephony controller receiving from the second computer terminal a request for a computer-telephony event; in which the request comprises the label value; the computer-telephony controller retrieving the identifier of the communications terminal from the mapping; and initiating the requested computer telephony event to control operation of the communications terminal; and
   receiving from the second computer terminal a mapping change request and creating, in response to the mapping change request, a second mapping accessible by the computer-telephony controller in which the label value is mapped to an identifier of a second communications terminal while leaving unchanged the label value stored at the second computer terminal.

2. A method as claimed in claim 1, in which the label value is associated with one of an individual user, a group of users and a type of user, in which the one of the individual user, the group of user and the type of user associated with the label value is authorised to control the at least one of the plurality of phones.

3. A method as claimed in claim 1 further comprising creating a second mapping accessible by the computer-telephony controller in which the label value is mapped to an identifier of a second communications terminal while leaving unchanged the label value stored at the second computer terminal; and
   following creation of the second mapping, receiving at the computer-telephony controller from the second computer terminal a request incorporating the label value for a computer-telephony event and initiating the requested computer-telephony event controlling operation of the second communications terminal.

4. A method of initiating, in a call control system, computer-telephony events; in which the call control system comprises a computer-telephony controller and a plurality of communications terminals;

in which a computer-telephony event comprises a user operating a computer terminal to control, through the computer-telephony controller, operation of at least one of the plurality of communications terminals, in which the method comprises:

providing a label value for storing at a first computer terminal; and storing, in a mapping accessible by the computer-telephony controller, the label value together with the identifier of one of the plurality of communications terminals;

the computer-telephony controller receiving from the first computer terminal a request for a computer-telephony event; in which the request comprises the label value;

the computer-telephony controller retrieving the identifier of one of the communications terminals from the mapping; and initiating the requested computer-telephony event to control operation of a communications terminal;

the computer-telephony controller receiving from a second computer terminal a request for the label value; and providing to the second computer terminal the requested label value;

the computer-telephony controller receiving from the second computer terminal a request for a computer-telephony event; in which the request comprises the label value; the computer-telephony controller retrieving the identifier of the communications terminal from the mapping; and initiating the requested computer telephony event to control operation of the communications terminal;

providing the second computer terminal with a list of communication terminal identifiers to which the label value has previously been mapped; and allowing re-establishment of a previous mapping; and receiving from the second computer terminal a mapping change request and creating, in response to the mapping change request, a second mapping accessible by the computer-telephony controller in which the label value is mapped to an identifier of a second communications terminal while leaving unchanged the label value stored at the second computer terminal.

5. A method as claimed in claim 4 in which the second mapping overwrites the first mapping.

6. A call control system for initiating computer-telephony events;

in which a computer-telephony event comprises a user operating a computer terminal to control, through a computer-telephony controller, operation of at least one of a plurality of communications terminals, in which the system comprises a computer-telephony controller and a plurality of communications terminals;

in which the call control system comprises a store accessible by the computer-telephony controller, for storing a mapping between a label value and an identifier of one of a plurality of communications terminals;

in which the computer-telephony controller comprises a first interface for receiving from a first computer terminal a request for a first computer-telephony event;

in which the computer-telephony controller comprises a processor configured to receive through the first interface from the first computer terminal the request for a first computer-telephony event in which the request comprises the label value; to apply the label value to the mapping to retrieve from the store the identifier of a communications terminal; and to initiate the requested first computer-telephony event to control operation of the communications terminal;

in which the computer-telephony controller comprises a second interface for receiving from a second computer terminal a request for the label value and a request for a second computer-telephony event;

in which the computer-telephony controller processor is configured to receive through the second interface from the second computer terminal the request for the label value; and to provide the label value to the second computer terminal;

in which the computer-telephony controller processor is configured to receive through the second interface from the second computer terminal the request for a second computer-telephony event in which the request comprises the label value; to apply the label value to the mapping to retrieve the identifier of one of the communications terminals from the store; and to initiate the requested second computer telephony event to control operation of the communications terminal; and which receives from the second computer terminal a mapping change request and creates, in response to the mapping change request, a second mapping accessible by the computer-telephony controller in which the label value is mapped to an identifier of a second communications terminal while leaving unchanged the label value stored at the second computer terminal.

7. A computer-telephony controller for controlling operation of at least one of a plurality of communications terminals call control system for initiating computer-telephony events;

a store for storing a mapping between a label value and an identifier of one of a plurality of communications terminals; and a processing system, including a computer processor, the processing system being at least configured to:

receive, from a first computer terminal, a request for a first computer-telephony event in which the request comprises the label value; to apply the label value to the mapping to retrieve from the store the identifier of a communications terminal;

initiate the requested first computer-telephony event to control operation of the communications terminal;

receive, from a second computer terminal different from the first terminal, a request for the label value and a request for a second computer-telephony event;

in response to the received request for the label value from the second computer terminal, provide the label value to the second computer terminal;

receive, from the second computer terminal, a request for a second computer-telephony event in which the request for the second computer-telephony event comprises the label value;

apply the label value to the mapping to retrieve the identifier of one of the communications terminals from the store;

initiate the requested second computer telephony event to control operation of the communications terminal; and receive from the second computer terminal a mapping change request and create, in response to the mapping change request, a second mapping accessible by the computer-telephony controller in which the label value is mapped to an identifier of a second communications terminal while leaving unchanged the label value stored at the second computer terminal.

8. The computer-telephony controller as claimed in claim 7, wherein the label value is associated with one of an individual user, a group of users and a type of user, in which the one of the individual user, the group of user and the type of user associated with the label value is authorized to control the at least one of the plurality of phones.

9. The computer-telephony controller as claimed in claim 7, wherein the processing system is further configured to:
receive, from the second computer terminal, a mapping change request; and
create, in response to the mapping change request, a second mapping in which the label value is mapped to an identifier of a second communications terminal while leaving unchanged the label value stored at the second computer terminal.

10. The computer-telephony controller as claimed in claim 9 wherein the second mapping overwrites the first mapping.

11. The computer-telephony controller as claimed in claim 7, wherein the processing system is further configured to:
create a second mapping in which the label value is mapped to an identifier of a second communications terminal while leaving unchanged the label value stored at the second computer terminal; and
following creation of the second mapping, receive from the second computer terminal a request incorporating the label value for a computer-telephony event and initiate the requested computer-telephony event controlling operation of the second communications terminal.

12. A method of initiating, in a call control system, computer-telephony events; in which the call control system comprises a computer-telephony controller and a plurality of communications terminals;
in which a computer-telephony event comprises a user operating a computer terminal to control, through the computer-telephony controller, operation of at least one of the plurality of communications terminals,
in which the method comprises:
providing a label value for storing at a first computer terminal; and storing, in a mapping accessible by the computer-telephony controller, the label value together with the identifier of one of the plurality of communications terminals;
the computer-telephony controller receiving from the first computer terminal a request for a computer-telephony event; in which the request comprises the label value;
the computer-telephony controller retrieving the identifier of one of the communications terminals from the mapping; and initiating the requested computer-telephony event to control operation of a communications terminal;
the computer-telephony controller receiving from a second computer terminal a request for the label value; and providing to the second computer terminal the requested label value;
the computer-telephony controller receiving from the second computer terminal a request for a computer-telephony event; in which the request comprises the label value; the computer-telephony controller retrieving the identifier of the communications terminal from the mapping; and initiating the requested computer telephony event to control operation of the communications terminal;

the computer-telephony controller creating a second mapping accessible by the computer-telephony controller in which the label value is mapped to an identifier of a second communications terminal while leaving unchanged the label value stored at the second computer terminal; and
following creation of the second mapping, the computer-telephony controller receiving from the second computer terminal a request incorporating the label value for a computer-telephony event and initiating the requested computer-telephony event controlling operation of the second communications terminal.

13. A call control system for initiating computer-telephony events;
in which a computer-telephony event comprises a user operating a computer terminal to control, through a computer-telephony controller, operation of at least one of a plurality of communications terminals,
in which the system comprises a computer-telephony controller and a plurality of communications terminals;
in which the call control system comprises a store accessible by the computer-telephony controller, for storing a mapping between a label value and an identifier of one of a plurality of communications terminals;
in which the computer-telephony controller comprises a first interface for receiving from a first computer terminal a request for a first computer-telephony event;
in which the computer-telephony controller comprises a processor configured to receive through the first interface from the first computer terminal the request for a first computer-telephony event in which the request comprises the label value; to apply the label value to the mapping to retrieve from the store the identifier of a communications terminal; and to initiate the requested first computer-telephony event to control operation of the communications terminal;
in which the computer-telephony controller comprises a second interface for receiving from a second computer terminal a request for the label value and a request for a second computer-telephony event;
in which the computer-telephony controller processor is configured to receive through the second interface from the second computer terminal the request for the label value; and to provide the label value to the second computer terminal;
in which the computer-telephony controller processor is configured to receive through the second interface from the second computer terminal the request for a second computer-telephony event in which the request comprises the label value; to apply the label value to the mapping to retrieve the identifier of one of the communications terminals from the store; and to initiate the requested second computer telephony event to control operation of the communications terminal;
in which the computer-telephony controller processor is configured to create a second mapping accessible by the computer-telephony controller in which the label value is mapped to an identifier of a second communications terminal while leaving unchanged the label value stored at the second computer terminal; and
in which, following creation of the second mapping, the computer-telephony controller processor is configured to receive at the computer-telephony controller from the second computer terminal a request incorporating the label value for a computer-telephony event and initiate the requested computer-telephony event controlling operation of the second communications terminal.

14. A computer-telephony controller for controlling operation of at least one of a plurality of communications terminals call control system for initiating computer-telephony events;

a store for storing a mapping between a label value and an identifier of one of a plurality of communications terminals; and a processing system, including a computer processor, the processing system being at least configured to:

receive, from a first computer terminal, a request for a first computer-telephony event in which the request comprises the label value; to apply the label value to the mapping to retrieve from the store the identifier of a communications terminal;

initiate the requested first computer-telephony event to control operation of the communications terminal;

receive, from a second computer terminal different from the first terminal, a request for the label value and a request for a second computer-telephony event;

in response to the received request for the label value from the second computer terminal, provide the label value to the second computer terminal;

receive, from the second computer terminal, a request for a second computer-telephony event in which the request for the second computer-telephony event comprises the label value;

apply the label value to the mapping to retrieve the identifier of one of the communications terminals from the store;

initiate the requested second computer telephony event to control operation of the communications terminal; and create a second mapping accessible by the computer-telephony controller in which the label value is mapped to an identifier of a second communications terminal while leaving unchanged the label value stored at the second computer terminal; and following creation of the second mapping, receive at the computer-telephony controller from the second computer terminal a request incorporating the label value for a computer-telephony event and initiate the requested computer-telephony event controlling operation of the second communications terminal.

* * * * *